July 24, 1928.                E. L. O. PATTEN ET AL                1,678,479
                                    WINDOW
                    Filed Feb. 6, 1924            2 Sheets-Sheet 1

July 24, 1928.                                                           1,678,479
E. L. O. PATTEN ET AL
WINDOW
Filed Feb. 6, 1924                         2 Sheets-Sheet 2

Patented July 24, 1928.

1,678,479

UNITED STATES PATENT OFFICE.

ERNEST L. O. PATTEN, OF LAKEWOOD, OHIO, AND RAYMOND E. PATTEN, OF DETROIT, MICHIGAN.

WINDOW.

Application filed February 6, 1924. Serial No. 690,912.

Our invention relates to windows or the like and is particularly adapted for use in connection with the windshield and front side window of an automobile of the enclosed type, such as sedans, coupés, limousines and broughams, in which the front corner construction of the body is of considerable cross-sectional area and forms a material obstruction to the vision of the driver.

The object of the invention is to increase the scope of vision of an observer stationed behind the window or windshield, and particularly to eliminate the "blind spot" produced in the field of vision by the front corner of the body of such automobile.

The said invention consists of means hereinafter fully described and particularly set forth in the claims.

The annexed drawing and the following description set forth in detail certain means embodying our invention, the disclosed means, however, constituting but some of the various forms in which the principle of our invention may be applied.

Figure 1:
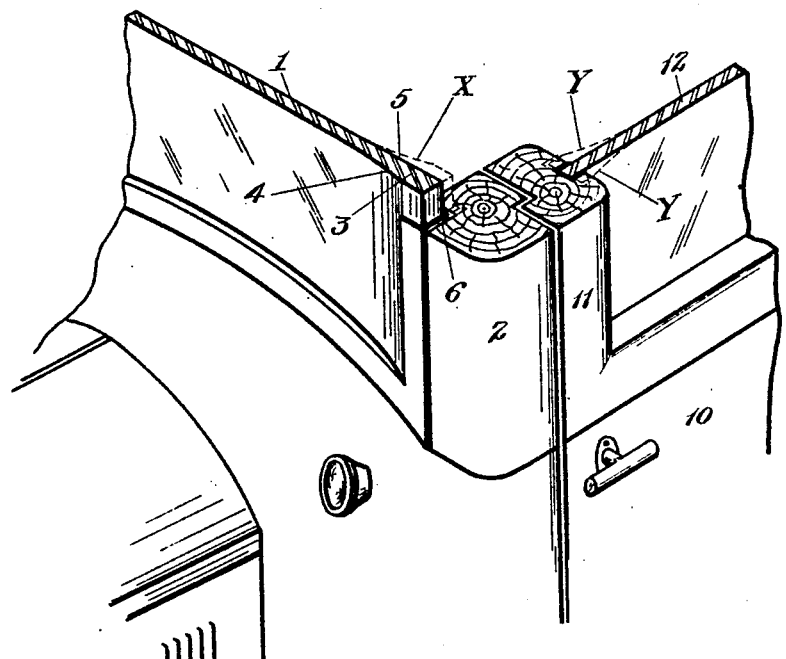
Figure 1 represents a sectional perspective of the front part of an automobile to which our invention is applied.

The illustrated embodiment of our invention is shown in the drawings as having been applied to the windshield of an automobile of the above-mentioned enclosed type.

Figure 2:
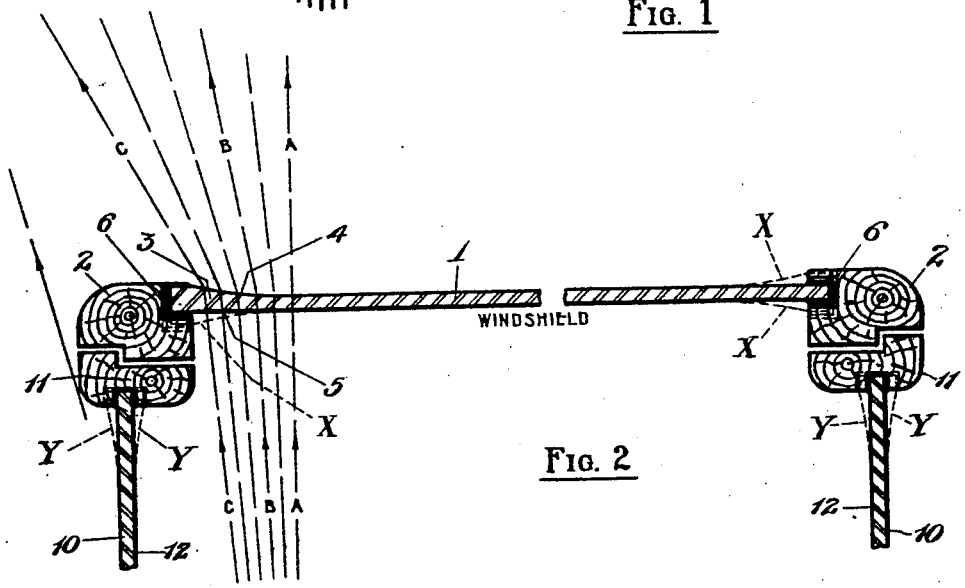
Fig. 2 represents a horizontal section of the windshield and adjacent parts.

Referring first to the form of the invention illustrated in Figs. 1 and 2, the windshield consists of the glass plate 1 which is mounted in the front of the body in the usual manner, the upright corner or side members 2 of the body forming the lateral frame members of the shield.

Instead, however, of using a glass plate having both its faces parallel throughout, we use a plate having a marginal or edge portion 3 of prismatic section, that is having its two faces 4 and 5, angularly related, the angularity being such that the transverse section increases outwardly with reference to the plate, as shown in Fig. 2. The main part of the faces of the plate are parallel with each other, as shown. All transverse sections of this portion of the plate are similar so that the longitudinal sections thereof will be rectangular, as will be seen from an inspection of Fig. 1.

It will therefore be seen that this edge portion of the plate is of increased refractive power as compared with the balance of the plate and further will refract rays of light that are perpendicular to the plane of the main portion of the plate. It will also be noted that the refracting edge portion of the plate is immediately adjacent to the lateral frame member 2.

As a result of the above-described form of the plate, rays of light coming from an object in front of the automobile and which would otherwise strike the corner member 2, will, upon passing through the refracting portion 3, reach the eyes of the driver, and such object then be brought into the scope of his vision, as is indicated by the dotted lines A—A, B—B, and C—C, Fig. 2, which indicate light rays.

In said Figs. 1 and 2 we have shown a form of plate in which the rear face is flat throughout and the edge portion of the other face is made curvilinear so as to produce the desired prismatic cross-section.

In case it is desired to increase the refractive power of the part 3 of the plate, the inner face of the edge portion thereof may be made curvilinear as indicated by the dotted line X, Figs. 1 and 2. Furthermore, both lateral edge portions of the plate may be constructed in the above-described manner, as indicated by the dotted line X at the right of Fig. 2.

Figure 3:
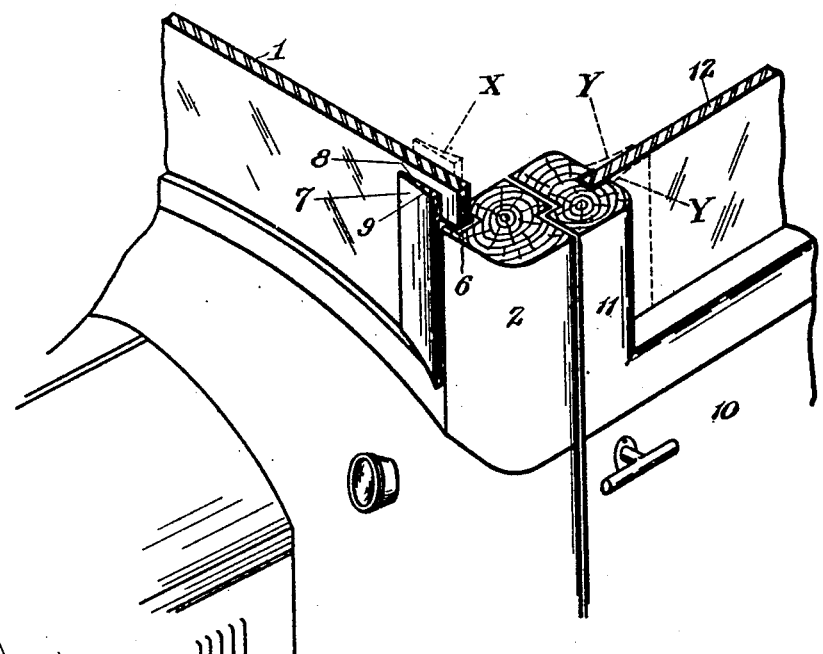
Fig. 3 represents a view similar to that of Fig. 1, but showing a modified form of our invention.
Figure 4:
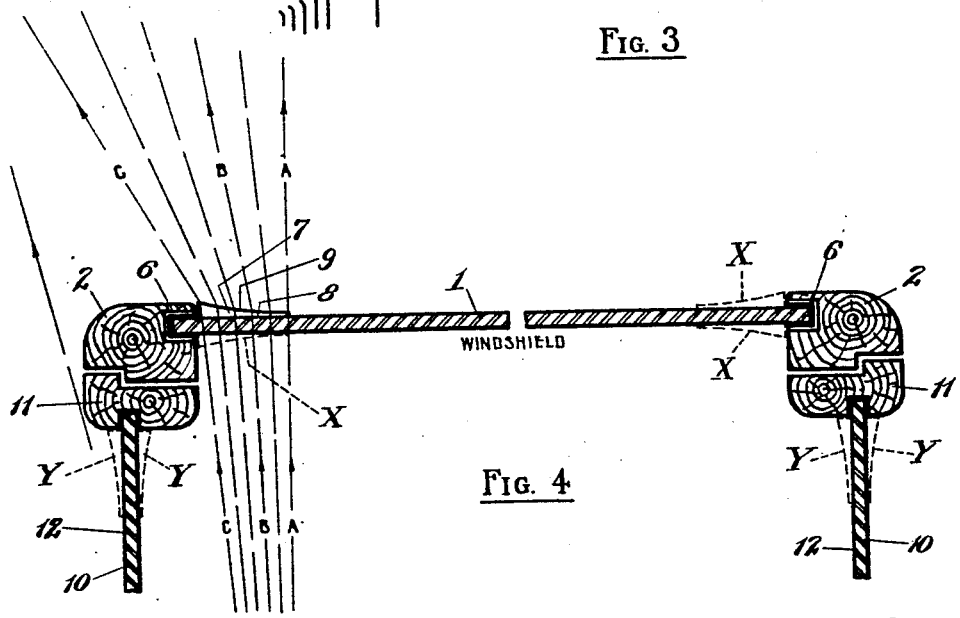
Fig. 4 represents a horizontal section of the construction shown in Fig. 3.

In said Figs. 1 and 2, we have shown the part 3 as constituting an integral part of the sheet. In such event, the groove 6 formed in the frame and which receives the edge portion of the sheet will be made of increased width to accommodate the increased thickness of glass, as shown at the left of Fig. 2.

Where it is not practical to change the width of the groove or apply our invention to a windshield of the heretofore usual construction without making any alterations in the frame, a separate strip 7 of glass may be cemented upon the usual flat-faced glass sheet adjacent to the lateral frame member, as shown in Figs. 3 and 4, said strip having an inner flat face 8 and an outer curvilinear or angular face 9. This construction produces the result previously described and will, in many cases, be preferable.

When the automobile body includes a front door, such as 10, the front vertical frame member 11 of the door window, when the door is closed, forms an additional obstruction to the vision of the driver, which is also overcome by the use of our invention.

If desired, the front edge portion of the glass plate 12 of the door may also be given the previously described construction as shown by the dotted lines Y—Y, in Figs. 2 and 4, and thus still further amplify the scope of vision of the driver as will be readily understood.

In the form of the window shown in Figs. 1 and 2, it will be apparent that the outer face of the edge portion 3 of the plate might be made flat instead of curvilinear and provide the necessary refraction, in which case, however, the junction of the flat face of the main part of the plate, or the flat face of the part 3, would be marked by a straight line which would form a break in the lateral continuity of an object viewed therethrough, which would be undesirable. By making the outer face of part 3 concavely curvilinear, such break in the continuity is avoided.

When the form of our invention is used, having the cemented strip 7, the latter is constituted a part of the entire glass sheet.

What we claim is:

1. The combination with a window frame having two upright members; of a sheet of glass extending between and laterally supported by said members; a marginal portion only of said sheet being of prismatic horizontal section; the major base of such section being on the outer side of the sheet and directly adjacent one of said members; and the vertical section of the sheet being rectangular throughout; all of that portion of the sheet other than said marginal portion, having its opposite faces flat and parallel with each other.

2. The combination with a window frame having two upright members; of a sheet of glass extending between and supported by said members; a lateral portion of that part of said sheet embraced between said members and immediately adjacent to one of the latter, being of prismatic cross-section, the major base of such section being directly contiguous to said member; the vertical section of said sheet being rectangular throughout.

3. In a motor vehicle, the combination with a body having two upright frame members; of a transparent sheet of glass; said frame members forming lateral supports for said sheet; that part of the latter adjacent to one of and embraced between said supports having a prismatic horizontal section; the relatively inclined surfaces of the sheet so produced, converging inwardly with reference to the vertical median plane of the sheet; the main portion of said sheet being rectangular in vertical and horizontal section.

4. A window comprising a frame and a transparent member mounted therein said member being formed so as to provide a portion adjacent to said frame having a transverse cross-section increasing in thickness outwardly of the transparent member and whose longitudinal section is rectangular, one of the faces of said portion of the transparent member being concavely curvilinear.

5. A windshield for automobiles, which comprises the combination with the windshield frame including the upright side members; of a sheet of glass set into said frame; the portion of the sheet adjacent to said side members being prismatic in horizontal section, the major thickness of the prism being directly adjacent such side member.

6. A windshield for automobiles, which comprises the combination with the windshield frame including the upright side members; of a sheet of glass set in said frame; that portion of the sheet adjacent to one of the side members of the frame being prismatic throughout in horizontal section, the major thickness of the prism being directly adjacent such side member.

7. The combination with a vehicle having a substantially opaque body member and a seat member, said members being so relatively positioned that a person normally occupying said seat will have a partially obstructed field of vision down a street which is disposed to the front of the vehicle and laterally of the street being traveled upon, of light directing means, and means for supporting the same forwardly of said seat and with such respect to said opaque member as to permit an occupant of said seat to see the image of an object in said obstructed field of vision.

8. The combination with a vehicle having a substantially opaque body member and a seat member, said members being so relatively positioned as to obstruct partially the field of vision of a person normally occupying said seat, of a refracting prism, and means for supporting said prism and so positioning the same relative to said opaque member that a person normally occupying said seat may see the image of an object in said obstructed field.

Signed by me this 26th day of January, 1924.

ERNEST L. O. PATTEN.

Signed by me this 28th day of January, 1924.

RAYMOND E. PATTEN.